Patented Feb. 26, 1946

2,395,507

UNITED STATES PATENT OFFICE 2,395,507

VULCANIZATION OF SYNTHETIC RUBBER

Doran E. Sauser, Cuyahoga Falls, Ohio, assignor to The B. F. Goodrich Company, New York, N. Y., a corporation of New York No Drawing. Application May 24, 1943, Serial No. 488,211

16 Claims. (Cl. 260—84.5)

This invention relates to the vulcanization or curing of synthetic rubber of the type which may be defined as rubbery copolymers of butadiene-1,3 hydrocarbons with copolymerizable mono-olefinic compounds, and has as its principal object to provide a new class of vulcanizing agents by the use of which such synthetic rubber may be cured efficiently and economically and improved vulcanizates obtained, without the use of sulfur and other conventional sulfur-containing vulcanizing agents.

The vulcanization or curing, i. e., the conversion from an essentially plastic condition to an essentially elastic, non-plastic condition, of rubbery copolymers of butadiene-1,3 hydrocarbons with copolymerizable mono-olefinic compounds has heretofore been effected by heating the copolymer with about 1 to 10% of sulfur in much the same manner that natural crude rubber is vulcanized. Furthermore, it has heretofore been believed that the presence of sulfur or some other conventional sulfur-containing vulcanizing agent such as sulfur monochloride, sulfur dithiocyanate, tetraalkyl thiuram sulfides or the like was absolutely necessary for the vulcanization of this type of synthetic rubber.

While this method of vulcanization has been more or less satisfactory, there are many instances, particularly when the synthetic rubber to be vulcanized is in the form of a liquid composition such as a solution or cement, where it is desirable to effect a cure at lower temperatures and in a shorter time than is possible with the known vulcanizing technique. For example, it has not been possible to air cure cements containing this type of synthetic rubber at room temperature in a few hours except by the combined use of sulfur and ultra-rapid accelerators of vulcanization. It has also been difficult to effect a rapid cure of synthetic rubber compositions of the type used in tires, tubes, molded goods and the like when sulfur is the vulcanizing agent, and even when ultra-rapid accelerators of vulcanization are used in connection with the sulfur, satisfactory cures are not always obtained since undesirable scorching of the vulcanizate frequently occurs.

I have now discovered that rubbery copolymers of butadiene-1,3 hydrocarbons and copolymerizable mono-olefinic compounds may be rapidly vulcanized, even in the absence of sulfur and other conventional vulcanizing agents, by the use of polyalkylene polyamines as the vulcanizing agents. Such amines may be incorporated in solid or liquid compositions comprising such synthetic rubber and the compositions then vulcanized. They may be added to solutions and cements of such synthetic rubber to produce compositions which will air cure in a few hours at room temperature, and they may otherwise be used to replace or to supplement the conventional vulcanizing agents, their use as the sole vulcanizing agent being preferred.

Any desired polyalkylene polyamine that is, any organic compound containing a plurality of amine groups attached to a plurality of alkylene radicals (divalent aliphatic hydrocarbon radicals having the two free valences attached to different carbon atoms, may be employed as the vulcanizing agent. Typical examples of such polyamines include diethylene triamine, tetraethylene pentamine, triethylene tetramine, tetraethylene pentamine, pentaethylene hexamine, dipropylene triamine, diethylene diamine (piperazine), tetrabutylene pentamine, triethylene triamine, diethylene tetramine, triamino triethyl amines, triethyl diethylene triamine, phenyl triethylene tetramine and the like. The polyalkylene polyamines of the formula

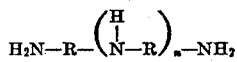

wherein R is an alkylene group and $n$ is an integer from 1 to 5 are preferred polyamines for use in this invention, tetraethylene pentamine being particularly preferred.

In the practice of the invention one or more of the above-mentioned polyalkylene polyamines is associated with an unvulcanized rubbery copolymer of a butadiene-1,3 hydrocarbon and a copolymerizable mono-olefinic compound, and the composition is then vulcanized. The amine may be incorporated in the rubbery copolymer while the latter is being worked on a roll mill or masticated in an internal mixer and may be added alone, in admixture with compounding ingredients such as pigments, antioxidants, softeners or other vulcanizing agents and vulcanization accelerators, or in the form of a masterbatch. When the rubbery copolymer is in the form of a cement or dispersed in water or a solvent, the amine may simply be dissolved or dispersed therein. The vulcanization of the synthetic rubber composition containing the vulcanizing agent may be effected in a heated mold, in open steam, in hot air or, in the event the composition is a solution or a cement, simply by allowing the composition to air cure at room temperature. The conditions required for vulcanization such as time and temperature will obviously be dependent on the nature of the particular composition to be vulcanized and are not critical.

The proportions of the polyalkylene polyamine to be used may be varied within wide limits. The use of from 0.5 to 5% or even 10% based on the weight of the synthetic rubber is ordinarily preferred although greater or smaller amounts may desirably be employed in some instances.

Any of the rubbery copolymers of one or more butadiene-1,3 hydrocarbons such as butadiene-1,3, isoprene, 2,3-dimethyl butadiene-1,3, piperylene or the like, with one or more copolymerizable mono-olefinic compounds may be vulcanized by the method of this invention. Copolymerizable monoolefinic compounds are organic compounds which contain a single olefinic double bond,

and which are copolymerizable with butadiene-1,3 hydrocarbons. Such compounds are usually low molecular weight compounds of less than 10 carbon atoms which contain at least two hydrogen atoms and at least one radical other than hydrogen attached to the doubly bound carbon atoms, as in the structure

where at least one of the disconnected valences is attached to a group other than hydrogen and more electronegative than hydrogen such as chlorine, alkyl, alkoxy, acyl or, as is more often the case, a group containing an unsaturated bond other than an olefinic double bond conjugated with the double bond in the

group such as an aryl group, a

group or a C≡N group. Examples of such compounds include styrene, p-methyl styrene, alpha-methyl styrene, p-chloro styrene, vinyl naphthalene and similar aryl olefins and substituted aryl olefins; isobutylene and similar copolymerizable olefinic hydrocarbons; acrylic and substituted acrylic acids and their esters, nitriles and amides such as acrylic acid, acrylonitrile, methacrylonitrile, alpha-chloro acrylonitrile, methyl acrylate, methyl methacrylate, ethyl methacrylate, methyl alpha-chloro acrylate, acrylamide, methacrylamide and the like; vinyl methyl ketone, vinyl methyl ether, vinylidene chloride and similar copolymerizable compounds containing a single olefinic double bond. Although rubbery copolymers prepared by the copolymerization by any desired method of a butadiene-1,3 hydrocarbon and a copolymerizable mono-olefinic compound in any desired proportions (providing a rubbery material is the product) may be used, the rubbery copolymers which are ordinarily employed in this invention are those prepared by the copolymerization in aqueous emulsion of butadiene 1,3 with a lesser amount of styrene, acrylonitrile or an acrylic ester or by the copolymerization of butadiene-1,3, and isobutylene. Such copolymers are known commercially under such names as "Ameripol," "Hycar," "Perbunan," "Buna S," "GR–S," "Chemigum," "Butyl," "Flexon," etc.

In order to illustrate the use of polyalkylene polyamines in the vulcanization of such synthetic rubbers the following examples are set forth:

*Example I*

A rapid air-curing synthetic rubber cement useful as a coating composition, as an adhesive, and for various other purposes is prepared from a synthetic rubber composition made up of the following ingredients:

| | Parts |
|---|---|
| A rubber copolymer prepared by the copolymerization in aqueous emulsion of butadiene-1,3 and a lesser amount of acrylonitrile | 100 |
| Gastex carbon black | 100 |
| Stearic acid | 1 |
| Tricresyl phosphate | 20 |

The above composition is dissolved in a volatile organic solvent therefor such as benzene, toluene, chlorobenzene, acetone, methyl ethyl ketone, ethyl acetate, ethylene dichloride, nitroethane or the like, or a mixture of these, to form a 10% by volume cement; and 10 parts of tetraethylene pentamine either as such or dissolved in a solvent is added thereto. When the cement is then spread on a fabric base or applied to an adhesive joint or otherwise applied in the manner in which it is to be used, and is allowed to stand for about 24 hours at room temperature or is heated for 1 hr. at 158° F., the film deposited from the cement is found to be well vulcanized, strong and elastic and tightly adhered to the base. When the polyamine is not added to the cement, but the conventional curing ingredients such as sulfur and a vulcanization accelerators are added thereto instead, the cement does not cure at room temperature until several days or weeks and even when heated to 158° F. several hours are necessary for vulcanization. Moreover, when sulfur and zinc oxide are added in addition to the polyamine, the cement cures less rapidly than when only the polyamine is used thus showing the desirability of employing polyamines as the sole vulcanizing agents for such cements.

Similar ultra rapid air-curing synthetic rubber cements may be prepared when diethylene triamine, triethylene tetramine, hexamethylene tetramine and similar polyalkylene polyamines are substituted for the tetraethylene pentamine of the above example. Such cements are also obtained when various other synthetic rubber compositions, including compositions containing other pigments, softeners and compounding ingredients as well as other rubbery copolymers, are substituted for the composition of the above example.

As illustrated in the foregoing example it is generally preferred not to add the polyalkylene polyamine to the synthetic rubber cement until immediately or soon before the cement is to be used since the polyamine rapidly "sets up" or cures the cement into an irreversible gel. However, if it is desired to produce a gel to be used as such or to increase the viscosity of dilute solutions of synthetic rubber, this may be accomplished by addition of the polyamine either to the synthetic rubber composition before it is dissolved or to a solution thereof. The following example illustrates the preparation of an irreversible gel containing minimum amounts of synthetic rubber and maximum amounts of solvent.

*Example II*

A rubbery butadiene-1,3 styrene copolymer is dissolved in gasoline (or some other suitable solvent such as those mentioned in Example I) to form a 1 to 4% by volume solution. There is then added to this dilute solution 5% by weight based on the synthetic rubber of tetraethylene pentamine or some other aliphatic polyamine. Upon addition of the polyamine to the solution the solution begins to "set up" or cure and after a few hours an irreversible gel is formed. This "setting up" or curing may be accelerated by the application of heat if desired. Substituting the polyamines with sulfur, sulfur dichloride, carbon disulfide or with sulfur and an ultra vulcanization accelerator such as the zimates, "Butyl 8," "C. P. B." or the like does not produce a gel from such a dilute synthetic rubber solution.

In addition to the use of polyalkylene polyamines as vulcanizing agents for synthetic rubber cements, the present invention also contemplates the use of such polyamines as vulcanizing agents for any other type of synthetic rubber composition such as synthetic rubber latices for the manufacture of dipped goods and synthetic rubber compositions of the type used in the manufacture of tires, tubes, belting, hose, bullet-sealing gasoline tanks and the like. The following example will illustrate the use of polyamines in compositions suitable for use in tires and molded goods.

*Example III*

The following ingredients are mixed on a two roll mixing mill.

Rubbery butadiene-1,3 styrene:  Parts
  Copolymer _____ 100
  Channel black _____ 45
  Pine tar _____ 3
  Coal tar _____ 4
  Stearic acid _____ 2.5
  Phenyl-beta naphthylamine _____ 0.6
  Tetraethylene pentamine _____ 3.0

The resulting composition is then vulcanized in a press for 45 minutes at 280° F. An excellent vulcanizate having a higher tensile strength and elongation than similar stocks vulcanized with sulfur and an accelerator is obtained. It is to be noted that none of the conventional rubber vulcanizing agents is present in the composition, the tetraethylene polyamine being solely responsible for the vulcanization.

*Example IV*

A synthetic rubber composition containing the following ingredients is prepared:

Parts
Rubbery copolymer of 55 parts butadiene-1,3
  and 45 parts acrylonitrile _____ 100
Gastex carbon black _____ 100
Zinc oxide _____ 5
Stearic acid _____ 1
Tricresyl phosphate _____ 20
Diethylene triamine _____ 1

The composition is then vulcanized for 30 minutes at 240° F. whereupon a vulcanizate having excellent tensile strength and elongation is obtained. The tear resistance of the vulcanizate is also excellent. Similar excellent vulcanizates are obtained by substituting from 0.5 to 3.0 parts of triethylene tetramine and tetraethylene pentamine either as the sole curing agents or in combination with sulphur.

Although the invention has been illustrated by the foregoing examples it is to be understood that the invention is not limited thereto and that numerous variations and modifications which will be obvious to those skilled in the art are within the spirit and scope of the invention as defined by the appended claims.

I claim:

1. The method which comprises vulcanizing a rubbery copolymer of a butadiene-1,3 hydrocarbon and a copolymerizable mono-olefinic compound in the presence of a polyalkylene polyamine.

2. The method which comprises vulcanizing a rubbery copolymer of butadiene-1,3 and a copolymerizable mono-olefinic compound in the presence of a polyalkylene polyamine of the formula

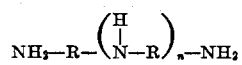

wherein R is an alkylene radical and $n$ is an integer from 1 to 5.

3. The method which comprises vulcanizing a rubbery copolymer of butadiene-1,3 and a copolymerizable mono-olefinic compound in the presence of tetraethylene pentamine.

4. The method which comprises vulcanizing a rubbery copolymer of butadiene-1,3 and a copolymerizable mono-olefinic compound in the presence of tetraethylene pentamine and in the absence of sulfur and other sulfur-containing vulcanizing agents.

5. The method which comprises vulcanizing a rubbery copolymer of butadiene-1,3 and styrene in the presence of a polyalkylene polyamine.

6. The method which comprises vulcanizing a rubbery copolymer of butadiene-1,3 and styrene in the presence of tetraethylene pentamine.

7. The method which comprises vulcanizing a rubbery copolymer of butadiene-1,3 and acrylonitrile in the presence of a polyalkylene polyamine.

8. The method which comprises vulcanizing a rubbery copolymer of butadiene-1,3 and acrylonitrile in the presence of tetraethylene pentamine.

9. A synthetic rubber composition comprising a rubbery copolymer of butadiene-1,3 and a copolymerizable mono-olefinic compound and, as a vulcanizing agent therefor, a polyalkylene polyamine.

10. A synthetic rubber composition comprising a rubbery copolymer of butadiene-1,3 and styrene and, as a vulcanizing agent therefor, a polyalkylene polyamine.

11. A synthetic rubber composition comprising a rubbery copolymer of butadiene-1,3 and acrylonitrile and, as a vulcanizing agent therefor, a polyalkylene polyamine.

12. An air curing synthetic rubber cement comprising a rubbery copolymer of butadiene-1,3 and acrylonitrile, a volatile organic solvent therefor and a polyalkylene polyamine.

13. A vulcanizate prepared by the method of claim 1.

14. A vulcanizate prepared by the method of claim 2.

15. A vulcanizate prepared by the method of claim 6.

16. A vulcanizate prepared by the method of claim 8.

DORAN E. SAUSER.